March 2, 1965     H. L. IMELMANN     3,171,505
ELECTRIC DRIVING SYSTEM
Filed July 14, 1961
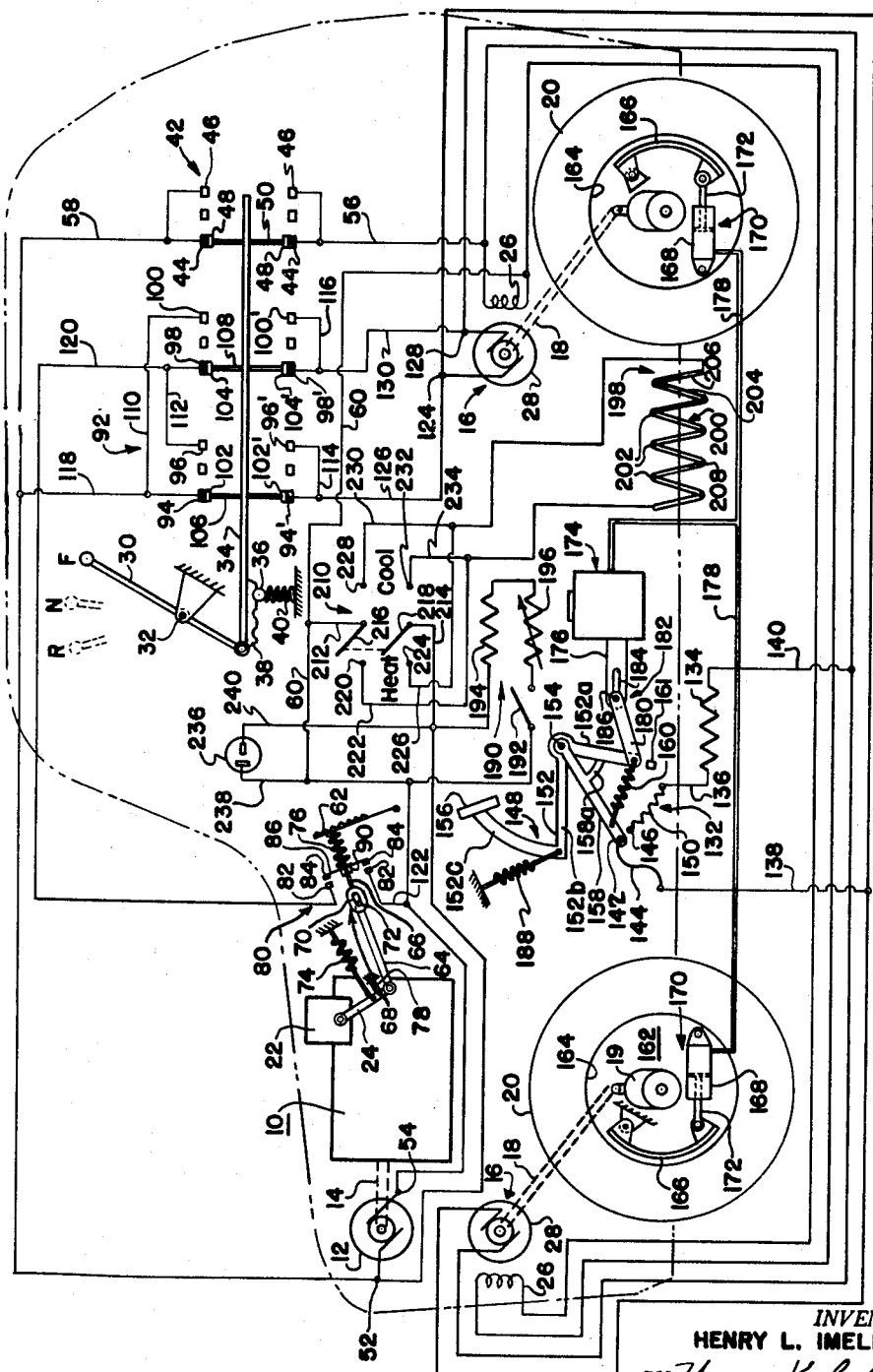
INVENTOR.
HENRY L. IMELMANN
BY Mason, Kolehmainen,
Rathburn & Wyss.
ATTORNEYS United States Patent Office 3,171,505
Patented Mar. 2, 1965

3,171,505
ELECTRIC DRIVING SYSTEM
Henry L. Imelmann, 933 S. State Road, Arlington Heights, Ill., assignor of one-fourth each to Nancy D. Culton and Lawrence John Culton, both of Des Plaines, Ill.
Filed July 14, 1961, Ser. No. 124,119
1 Claim. (Cl. 180—65)

This invention relates to electrically driven vehicles of the type having an internal combustion engine or other prime mover arranged to drive a generator to which the driving motors of the vehicle are connected.

While electric driving systems in general applying the motor-generator principle are well known, these systems have not been used extensively before since they have been considered impractical for small installations such as automobiles, tractors, buses, trucks, jeeps, etc., because it was thought that the electric generator and drive motor or motors for such an electric drive would be too large and cumbersome, and therefore, too expensive to justify their installation in such a vehicle, and because it was not known that such a vehicle could be set into motion at idling speed of the prime mover.

The electric driving system according to the present invention is advantageous over the conventional internal combustion engine vehicle or automobile wherein the prime mover is mechanically coupled to the wheels of the vehicle in that the electric driving system eliminates many of the expensive and complex drive connections such as the clutch, transmission, drive shaft, and differential.

Since a gasoline engine at idling speed cannot develop enough power to turn a generator that must produce this large number of amperes, it has been found to be necessary, in order to obtain motion of the vehicle at idling speed of its engine, to provide drive motors of a high voltage, low amperage type, having a voltage-to-amperage ratio of at least three to one.

After the vehicle is under way, and the armature of the drive motor is turning, the motor's ampere requirements will be lower and its voltage requirements will be higher, so that a motor-generator combination that is able to supply the starting current requirements of the drive motor at idling speed of the prime mover will have no difficulty in supplying the accelerating and running demands of this motor, especially when the r.p.m. of the prime mover is increased.

It is, therefore, an object of the present invention to provide an electric driving system for a vehicle that will enable the vehicle to get under way at idling speed of the prime mover, and to accelerate when the prime mover accelerates.

Another object of the present invention is to provide an electric driving system for a vehicle that is practical wherein the power to drive the vehicle is furnished by an internal combustion engine connected to an electric generator.

A further object of the present invention is to provide an improved electric driving system for a vehicle which has an auxiliary dynamic braking system.

Referring now to the electric driving system for a vehicle illustrated somewhat schematically in the drawing, the driving system includes a prime mover such as a gasoline powered internal combustion engine 10, mechanically connected to a self-excited generator 12 through a shaft 14 and arranged to drive a plurality of electric drive motors 16. As illustrated, there are shown two of the drive motors 16, one mechanically connected through a section of axle 18 to each of a pair of vehicle wheels 20 by a gear reducer 19; it is understood, of course, that any number of motors 16 may be used, for example, four such motors 16 to provide what is known as a four-wheel drive vehicle. The generator 12 is preferably directly coupled to the engine 10 so that the generator 12 continuously rotates when the engine 10 is running. Moreover, the engine 10 is provided with a throttle 22 and a throttle control lever 24 is operatively associated therewith for regulating the speed of the engine 10 between an idling speed and its maximum speed. The generator 12 is a self-excited type and is wound so as to provide a substantial voltage at engine idling speed. A typical generator 12 could provide 125 volts D.C. output at the engine idling speed and 500 volts D.C. at full engine power.

The electric motors 16 may be D.C., each of which is provided with a field or stator winding 26 and an armature or rotor winding 28 which is mechanically coupled to the axle 18.

As is well known, standard controls for operating a motor vehicle, such as an automobile, include a lever or push-button arrangement usually located beneath the steering wheel and movable by the operator to provide a forward position, indicated by the letter F in the drawing; a neutral position, indicated in phantom in the drawing, and designated by the letter N; and a reverse position, also indicated in phantom in the drawing and represented by the letter R therein. According to the present invention, a selector lever 30 is provided and is pivotally mounted about pivot 32 so as to axially position a switch rod 34. The selector lever 30 is held in the desired forward, neutral, or reverse position through a ball 36 biased into one of a plurality of positioning detents 38 on the switch rod 34 by a compression spring 40. The switch rod 34 is connected to operate a field winding control switch illustrated generally at 42 and including two pairs of contacts 44 and 46, each pair being adapted to be closed by contacts 48 carried on a bridging member 50 of electrically conductive material and electrically isolated from the switch rod 34 when the selector lever 30 is in the forward or reverse position respectively; the contacts 48 are out of engagement with cooperating contacts when the selector lever 30 is in a neutral position so that a switch open condition results. The field windings 26 are connected in parallel with each other, and are serially connected across a pair of output terminals 52 and 54 of the generator 12 with the switch 42, through the conductors 56, 58 and 60.

As is well known, the controls of a vehicle, such as an automobile, conventionally include an accelerator pedal 62 which is generally positioned on the floor board (not shown) of the vehicle and which is operatively connected to control the throttle 22 through the throttle control lever 24 by a throttle link 64 operatively connected with an accelerator link 66 through a lost motion connection 68. The lost motion connection 68 may conveniently comprise a pin 72 on the throttle link 64 operatively positioned in an elongated opening or slot 70 in one end of the accelerator link 66. In this manner, the first increment of movement of the accelerator pedal 62 is not effective to change the throttle setting of the engine 10, but the lost motion connection 68 provides for this relative motion between the links 64 and 66. The throttle control lever 24 is continuously biased to a throttle closed position by a tension spring 74, and the accelerator pedal 62 is likewise continuously biased to a throttle closed position by a spring (not shown) so that the throttle 22 is continuously biased into a throttle closed position. The closing of the throttle 22 is limited by a stop 78 limiting the closed position of the throttle control lever 24 and rendering the lost motion connection 68 effective to provide the lost motion between the accelerator pedal 62 and the throttle control lever 24 upon initial depression of the accelerator pedal 62. A power switch illustrated generally at 80 is operatively connected with the accelerator pedal 62 to connect a power circuit between the output terminals 52 and 54 of the generator 12 and the motors 16 upon initial depression of the accelerator pedal 62. Specifically, the switch 80 includes a pair of stationary contacts 82 adapted to be closed and bridged by a pair of movable contacts 84 carried on a bridging member 86 of electrically conductive material and slidable on the accelerator link 66 and insulated therefrom. The bridging member 86 is continuously biased away from the accelerator pedal 62 toward the stationary contacts 82. However, its movement toward the stationary contacts 82 is limited by a stop 90 secured to the accelerator link 66. However, upon initial depression of the accelerator pedal 62, the accelerator link 66 moves downwardly to the left as viewed in the drawing so that the stop 90 moves toward the stationary contacts 82 and the bridging member 86 carrying the movable contacts 84 is moved downwardly by the spring 76 so as to engage the stationary contacts 82 and to close the electric circuit thereacross. Additional depression of the pedal 62 causes the bridging member 86 to slide on the accelerator link 66, the bridging member 86 being held against the stationary contacts 82 by the compression spring 76. Moreover, further movement of the accelerator pedal beyond this initial increment necessary to close the circuit across the stationary contacts 82 is effective to take up the play in the lost motion connection 68 and to actuate the throttle control lever to further open the throttle 22 and accelerate the engine 10.

In order to develop the necessary torque to start the drive motors 16 under load, the motors 16 are of the high resistance type so that the current required to start the motors will fall within the range of the power producing capability of the engine at its idling speed and also within the amperage producing ability of the generator 12 at this speed. The voltage-to-amperage ratio of the drive motors 16 must be at least three-to-one, and the voltage-to-amperage ratio of the generator must also be at least three-to-one. Since the current requirements to start the motors are approximately three times greater than that required by the motors when running at their rated speed, the engine 10 and generator 12 would have no difficulty in maintaining the current requirements of the motor after the vehicle is in motion. By way of example, the total starting requirements of the motors 16 under the load of the vehicle may be 125 volts at 40 amperes, and the requirements of these same motors when under way might be 250 volts at 20 amperes, 375 volts at 14 amperes, or 500 volts at 10 amperes. The increase in voltage applied to the motors is readily obtainable by increasing the throttle opening of the engine 10 and thus increasing the speed of the generator 12.

In order to provide for reversal of the motors 16, the polarity of the voltage supplied to the armatures 28 thereof is reversed through a double-pole, double-throw type of polarity reversing switch 92 operatively connected to the selector lever 30. Specifically, the switch 92 includes four pairs of stationary contacts, 94, 94'; 96, 96'; 98, 98'; and 100, 100'; and two pairs of movable contacts 102, 102'; and 104, 104'. Each pair of movable contacts 102, 102' and 104, 104' is connected to an electrically conductive bridging members 106 and 108, respectively, which is secured in electrically isolated relation to the switch rod 34 controlled by the selector lever 30. The terminal 94 is connected to the terminal 100 by a conductor 110; the terminal 96 is connected to the terminal 98 by a conductor 112; the terminal 94' is connected to the terminal 96' by a conductor 114; and the terminal 98' is connected to the terminal 100' through the conductor 116. The switch 92 is arranged so that when the selector lever 30 is in a forward position, the contacts 94, 94' are closed by the contacts 102 on the bridging member 106, and the contacts 98, 98' are closed by the contacts 104 on the bridging member 98; and when the selector lever 30 is in the reverse position the contacts 96, 96' are closed by the contacts 102 on the bridging member 106, and the contacts 100, 100' are closed by the contacts 104 on the bridging member 108; and when the selector lever 30 is in the neutral position the movable contacts 102 and 104 are electrically separated from any of the stationary contacts so that the switch 92 is in an open position. It is seen that the motors are all connected in parallel, and are connected through the switch 80 controlled by the accelerator pedal 62 across the output terminals 52 and 54 of the generator 12 through the polarity reversing switch 92. Specifically, the contact 94 of the switch 92 is connected to the output terminal 52 through a conductor 118. The contact 98 of the switch 92 is connected to the switch 80 through a conductor 120, the switch 80 being connected to the output terminal 54 of the generator 12 through a conductor 122. Moreover, the contact 94' of the switch 92 is connected to one of the terminals 124 of the motors 16 through a conductor 126 and the terminal 98' is connected to another terminal 128 thereof through a conductor 130. In this manner, the selector lever 30 is effective first to energize the field windings 26 of the motor 16 when the selector lever 30 is in a forward or reverse position; secondly, to reverse the direction of applied voltage to the armatures 28 of the motors 16 when the selector lever 30 is moved between the forward or reverse positions; and, thirdly, to disconnect the armatures 28 from the electrical system when the selector lever 30 is in a neutral position. Moreover, the accelerator switch 80 is effective to apply power to the reversing switch 92 upon initial depression of the accelerator pedal 62, and to remove the power connection from the switch 92 when the accelerator pedal 62 is permitted to return to its idling position.

In order to provide for reducing the speed of the vehicle, the vehicle is provided with both dynamic braking means and with friction braking means, here illustrated as a hydraulic braking system. According to the present invention, a first increment of movement of the brake pedal closes a switch in the braking system to provide a dynamic braking effect and a second increment of depression of the pedal actuates a rheostat in the brake system to increase the dynamic braking effect. Moreover, additional depression of the brake pedal through a third increment of travel actuates the hydraulic brake system of the vehicle, so that an independent braking action is applied to the vehicle. The dynamic braking system includes a switch and rheostat assembly illustrated generally at 132 and a resistance load 134 serially connected with each other through a lead 136 and serially connected across the armatures 28 of the motors 16 through a pair of leads 138 and 140 which are connected to the armature terminals 124 and 128. The switch and rheostat assembly 132 includes a movable contact 142 connected to the lead 138 through a flexible lead 144 and adapted to engage a stationary contact 146 upon initial depression of a brake pedal assembly 148 through a first increment of movement and to slide along a rheostat winding 150 during a second increment of brake pedal depression. The brake pedal assembly 150 includes a brake member 152 pivotally mounted on a shaft 154 and including a first arm 152a and a second arm 152b at an angle normal to the first arm 152a and a second arm 152b at an angle normal to the first arm 152a and provided at its end remote from the pivot 154 with a rod portion 152c carrying a brake pedal 156. Depression of the brake pedal 156 to initiate the braking action of the vehicle causes the arms 152a and 152b to rotate counterclockwise as shown in the drawing about the shaft 154. The brake pedal assembly 148 additionally includes a switch member 158 of electrically insulating material and pivotally mounted on the shaft 154 independently of the brake member 152. The switch member 158, however, is provided with a projection 158a which engages the arm 152a so that in the released position it spaces the switch member 158 relative to the arm 152a of the brake member 152. A tension spring 160 continuously biases the switch member 158 toward the arm 152a. The switch member 158 carries the movable contact 142 at its lower end for engagement with the fixed contact 146 and the rheostat winding 150. It will be understood that the brake pedal assembly 148 is normally mounted adjacent to the floor board (not shown) of the vehicle and generally positioned adjacent to the accelerator pedal 62 of the vehicle. In operation, when it is desired to reduce the speed of the vehicle, it is customary that the operator remove his foot from the accelerator pedal 62 automatically to open the circuit between the generator 12 and the motors 16 through the action of the switch 80. The operator then depresses the brake pedal 156. Initial depression of the brake pedal 156 through a first increment of travel will cause the switch member 158 to rotate as a unit with the arm 152a of the brake pedal assembly 148 due to the bias of the tension spring 160 and the engagement therewith by the projection 158a of the switch member 158 so that the initial depression thereof will cause the movable contact 142 to engage the fixed contact 146 and to establish a resistance load including the rheostat 150 and the resistance 134 across the terminals 124 and 128 of the motor 16. Additional depression of the brake pedal 156 through the second increment of travel will move the movable contact 142 along the rheostat 150, reducing the resistance of the dynamic braking circuit and increasing the load on the motors 16, which are now acting as generators to increase the dynamic braking effect of the system. After the brake pedal 156 has passed through this second increment of travel, the switch member 158 will move against a fixed stop 161 to limit the movement of the switch member 158. Additional movement of the brake pedal 156 through the third increment of travel will rotate the arm 152a counterclockwise as shown in the drawing, the switch member 158 remaining stationary, the tension spring 160 being effective to permit the angular separation of these elements.

In order to provide for independent braking action in the event that the dynamic braking is not sufficient to decrease the speed of the vehicle to the desired point, and to provide for braking action when the vehicle is stationary, the vehicle is provided with a friction brake system, here illustrated as a hydraulic brake system generally illustrated at 162. As is well known, in a conventional hydraulic brake system the wheels 20 of the vehicle are provided with brake drums 164 which are each adapted to be frictionally engaged by one or more brake shoes 166. The brake shoes 166 are operatively connected to a piston 168 of a hydraulic brake wheel assembly 170 through a piston rod 172 and hydraulic fluid under pressure is supplied to the piston 170. The hydraulic fluid under pressure is provided by a hydraulic or master cylinder assembly 174 of the type conventionally used in vehicle brakes and which is hydraulically connected to the wheel cylinders 170 by a plurality of hydraulic lines 178. The master cylinder assembly 174 contains a piston or actuating rod 176, depression of which is effective to apply the hydraulic braking load to the brake drum 164 through the hydraulic wheel cylinders 170.

In order to provide for initial depression of the brake pedal 156 to connect dynamic braking loads only to the vehicle as the brake pedal 156 is depressed through the first and second increments of travel, and to provide for application of the friction braking means during the third increment of brake pedal travel, the actuating rod 176 is connected to one end of a brake rod 180 through a lost motion connection 182. The other end of the brake rod 180 is connected to the lower end of the arm 152a of the brake member 152. The lost motion connection 182 includes an elongated opening or slot 184 in the actuating rod 176 and a pin 186 is slidably positioned within the slot 184 and connected to the brake rod 180 to provide a pin-and-slot connection with the actuating rod 176. The length of the slot 184 is sufficient so that relative motion occurs between the actuating rod 176 and the brake rod 180 during depression of the brake pedal 156 through the first and second increments of travel, and the free motion between the actuating rod 176 and the brake rod 180 ends when the brake pedal 156 is depressed through the third increment of travel beyond the point at which the switch member 158 has come to rest against the stop 161. Through this third increment of brake pedal travel, the brake pedal assembly 148 is effective to act on the actuating rod 176 of the master cylinder 174 and to depress the actuating rod 176, thereby building up a hydraulic pressure in the master cylinder assembly 174 which is transmitted to the hydraulic wheel cylinder 170 through the hydraulic lines 178 to apply the hydraulic friction brakes. Upon release of the brake pedal 156, a tension spring 188 is effective to rotate the brake member 152 clockwise while the brake rod 180 is moved to the left as viewed in the drawing. The switch member 158 remains fixed against the stop 161 until the brake member 152 passes through the third increment of its travel. At this point the arm 152a engages the projection 158a and simultaneously the actuating rod 176 has reached the end of its return travel. Additional release of the brake pedal 156 through its second and first increments of depression is effective to cause the spring 188 to further rotate the brake member 152 clockwise as shown in the drawing, the switch member 158 now moving with the brake member 152 as a unit therewith to first reduce the dynamic load on the motors 16 and then to remove the dynamic load entirely from the motors 16 when the movable contact 142 passes out of engagement with the rheostat 150 and the fixed contact 146. Simultaneously, through this second and first increment of brake travel, the lost motion connection 182 is effective to permit sliding of the pin 186 in the slot 184 and to provide relative movement between the brake rod 180 and the actuating rod 176.

In order to provide for dissipation of the heat created by the resistance loading of the motors 16 during the dynamic braking operation, the resistance 134 is illustrated as being outside of the passenger compartment of the vehicle. It is to be understood that the rheostat 150 is likewise subjected to temperature rise during dynamic braking operation, and it may be desirable to likewise position the rheostat 150 outside of the passenger compartment of the vehicle. Moreover, while the dynamic braking load is herein illustrated as a resistance loading, it is to be understood that any form of dynamic braking load may be connected across the switch and rheostat assembly 132 to dissipate the energy released. For example, the voltage produced at the armature terminals 124 and 128 of the motors 16 during the dynamic braking operation may be utilized to operate other accessories such as for charging the battery of the engine 10 or for heating the passenger compartment of the vehicle or the energy may be dissipated in the form of a regenerative control feeding the power back into the system. Moreover, the resistance load 134 may be placed in the passenger compartment of the vehicle in order to heat the vehicle.

In order to heat the passenger compartment of the vehicle, it may be desirable, but not necessary, to connect a heating resistance assembly 190 across the output terminals 52 and 54 of the generator in series with a heat control switch 192. The heating winding assembly 190 may conveniently include a winding of fixed resistance 194 serially connected with a winding 196 of variable resistance thereby to provide for regulation of the amount of heat supplied to the passenger compartment. As is well known in the heating art, the switch 192 may be actuated by a thermostat or other heat responsive means to provide for automatic regulation of the temperature in the passenger compartment. Due to the convenient availability of electrical power in the electric driving system, this system is particularly suited to electrical heating of the passenger compartment in the aforementioned manner.

In order to provide for cooling as well as heating of the passenger compartment, it may be desirable, but not necessary, to connect a thermoelectric assembly 198 across the output terminals 52 and 54 of the generator 12. Such a thermoelectric assembly 198 may be used in addition to, or in place of, the heating winding assembly 190 heretofore described. The thermoelectric phenomena operates so that when an electrical junction is formed between dissimilar elements which exhibit thermoelectric properties and current is passed through the junction in a first direction, the junction will become a hot junction with subsequent heating thereof, and when current is passed through the junction in the opposite direction the junction will become a cold junction with subsequent cooling. Since in an electrically operated vehicle large quantities of electrical power are readily available, the thermoelectric phenomena may be utilized to obtain heating or cooling of the vehicle. The thermoelectric assembly 198 illustrated in the drawing includes a plurality of the thermocouples designated at 200, each defining a junction 202 between elements of two different materials designated as 204 and 206. The materials from which the elements 204 and 206 are constructed may comprise any pair of materials or alloys which exhibit a thermoelectric effect, such as those disclosed in my French Patent No. 1,160,746, granted March 10, 1958. The junctions 202 of each thermocouple 200 are positioned within the passenger compartment of the vehicle and adjacent thermocouples are serially connected outside the passenger compartment of the vehicle through a plurality of junctions 208. It will be seen that each junction 202 within the passenger compartment includes a first element 204 of one alloy and a second element 206 of a second alloy, while each junction 208 outside of the passenger compartment of the vehicle includes a first element 206 of the second alloy and a second element 204 of the first alloy. When electrical current is passed through the thermocouple assembly in a first direction, the junctions 202 will become hot junctions and the junctions 208 will become cold junctions, and, conversely, when electrical energy is passed through the thermocouple assembly in the opposite direction the junction 202 will become cold junctions and the junctions 208 will become hot junctions.

In order to provide for the selection of heating or cooling of the passenger compartment, there is provided a double-pole, double-throw switch generally indicated at 210 having a first position representing a heat position and a second position representing a cool position. The switch is connected to the output terminals 52 and 54 of the generator 12 by electrical lines 212 and 214, respectively, each of which is connected to a movable switch blade 216 and 218, respectively. When the switch 210 is moved to a heat position, the switch blade 216 engages a first terminal 220 connected to one end of the thermocouple assembly through a line 222 and the switch blade 218 engages a second terminal 224 connected to the other end of the thermocouple assembly by a second line 226 so as to supply power across the thermocouple assembly in a first direction. However, when the switch 210 is moved to its other or cool position, the switch blade 216 engages a fixed contact 228 which is connected to the fixed contact 224 through a line 230 and the switch blade 218 engages a fixed contact 232 which is connected to the contact 220 through a line 234 so that electrical power is applied to the thermocouple assembly in the opposite direction resulting in cooling of the junctions 202 to cool the passenger compartment of the vehicle.

In order to provide a source of electric power for portable or stand-by use, of a polarized D.C. outlet 236 is connected across the output terminals 52 and 54 of the generator through lines 238 and 240, resepectively. The outlet 236 is preferably conveniently located externally of the vehicle to provide for easy connection.

From the above description it will be seen that a self-excited electric generator mechanically connected to an internal combustion engine is advantageous to supply the starting current requirements of the driving motors, even though the internal combustion engine is only operating at idling speed. A motor in each wheel, if so desired, is connected through switches in the driver's compartment to this generator. A separate switch is connected to the throttle of the internal combustion engine so that the motors of the vehicle are not energized unless this switch is closed. Another switch and rheostat is attached to the brake pedal in such a way that the first increment of movement of the brake pedal causes the proper circuits to close to effect dynamic braking. A further depression of the brake pedal causes the hydraulic system of the vehicle to become operative, so that the operator, at his own discretion, can operate both the dynamic and hydraulic brakes simultaneously. An electric outlet is provided somewhere so that an emergency connection can be made to the vehicle in order to utilize the power generated by the internal combustion engine. This outlet can also serve as a portable power connection. By lining the passenger compartment with resistance wires, this space can be electrically heated at the option of the operator, and by using the newly developed techniques of thermoelectric heating and cooling, this compartment can also be heated or cooled at the option of the operator. The improved electrically driven vehicle provides for a marked increase in economy, particularly in the fuel consumption of the prime mover, while at the same time eliminating the conventional clutch transmission drive shaft and differential. No power batteries and the accompanying recharging thereof are required. The vehicle is preferably provided with dynamic braking and may, if desired, be provided with four-wheel drive, four-wheel steering and four-wheel brakes. The electrically driven vehicle may conveniently be used for electric stand-by equipment or as a source of portable electric power. Moreover, the vehicle may conveniently be provided with electric heating and cooling.

While there has been illustrated and described a particular embodiment of the present invention, it will be appreciated that numerous changes and modifications are likely to occur to those skilled in the art, and it is intended in the appended claims to cover all such changes and modifications which fall within the true spirit and scope of the present invention.

What is claimed as new and desired to be secured by Letters Patent of the United States is:

A self-propelled electrically driven vehicle comprising a prime mover, a throttle control for varying the speed of the prime mover, an electric generator drivingly connected to said prime mover and having a volts-to-amps ratio of at least three-to-one, drive means for propelling said vehicle and including at least one electric drive motor also having a total volts-to-amps ratio of at least three-to-one, circuit means for connecting said motor with said generator, and including switch means operatively associated with said throttle control for closing said circuit to an operative position upon initial actuation of said throttle control, and for opening said circuit when said throttle control is returned to its idling position, friction brake means associated with said drive means for retarding said drive means, electric dynamic brake means for retarding said drive means, a circuit for operatively connecting said dynamic brake means with said motor, brake applying means operatively associated with both of said brake means for closing the last-mentioned circuit upon initial movement thereof to effect dynamic braking of said vehicle, and for applying said friction brake means upon additional movement thereof to effect additional friction braking of said vehicle.

References Cited by the Examiner

UNITED STATES PATENTS

| | | | |
|---|---|---|---|
| 484,182 | 10/92 | Dewey | 62—3 |
| 1,111,510 | 9/14 | Ward | 180—65 |
| 1,134,995 | 4/15 | Cook. | |
| 1,139,882 | 5/15 | Markle | 290—17 |
| 1,387,076 | 8/21 | Shawhan | 290—11 |
| 1,580,860 | 4/26 | Schurch | 290—17 |
| 1,585,351 | 5/26 | Ionides. | |
| 1,662,092 | 3/28 | Warhus. | |
| 1,670,007 | 5/28 | Rasmussen et al. | |
| 2,092,364 | 9/37 | Stevens | 303—3 |
| 2,815,083 | 12/57 | Ellingsworth | 180—65 X |

FOREIGN PATENTS 549,265  11/42  Great Britain.

A. HARRY LEVY, *Primary Examiner.*

PHILIP ARNOLD, *Examiner.*